(12) United States Patent
Holmer et al.

(10) Patent No.: US 12,077,317 B2
(45) Date of Patent: Sep. 3, 2024

(54) AIRBORNE VEHICLE ASSISTED LANDING SYSTEM AND METHOD THEREOF

(71) Applicant: SAAB AB, Linkoeping (SE)

(72) Inventors: Anna-Karin Holmer, Joenkoeping (SE); Johan Zanden, Norrahammar (SE); Stefan Andersson, Habo (SE)

(73) Assignee: SAAB AB, Linkoping (SE)

( * ) Notice: Subject to any disclaimer, the term of this patent is extended or adjusted under 35 U.S.C. 154(b) by 330 days.

(21) Appl. No.: 17/620,431

(22) PCT Filed: Jun. 17, 2020

(86) PCT No.: PCT/SE2020/050632
§ 371 (c)(1),
(2) Date: Dec. 17, 2021

(87) PCT Pub. No.: WO2020/256629
PCT Pub. Date: Dec. 24, 2020

(65) Prior Publication Data
US 2022/0324587 A1    Oct. 13, 2022

(30) Foreign Application Priority Data
Jun. 18, 2019  (SE) .................................... 1950744-1

(51) Int. Cl.
*B64F 1/20* (2006.01)
*G08G 5/00* (2006.01)
*G08G 5/02* (2006.01)

(52) U.S. Cl.
CPC ............. *B64F 1/20* (2013.01); *G08G 5/0026* (2013.01); *G08G 5/025* (2013.01)

(58) Field of Classification Search
CPC ....... B64F 1/20; B64D 45/08; B63B 2201/08; F21W 2111/06; G01S 1/70; G01S 17/42;
(Continued)

(56) References Cited

U.S. PATENT DOCUMENTS

| 2,498,294 A | 2/1950 | Pennow et al. |
| 3,885,876 A | 5/1975 | Konopka |
(Continued)

FOREIGN PATENT DOCUMENTS

| CN | 109866938 A | 6/2019 |
| EP | 2910967 A1 | 8/2015 |
(Continued)

OTHER PUBLICATIONS

The International Search Report and Written Opinion issued in International Application No. PCT/SE2020/050632 on Aug. 28, 2020, 21 pages.
(Continued)

*Primary Examiner* — Khoi H Tran
*Assistant Examiner* — Bryant Tang
(74) *Attorney, Agent, or Firm* — Alston & Bird LLP

(57) ABSTRACT

The present disclosure relates to a landing assistance system and method (100) for assisting an airborne vehicle (1) during landing on a landing area (2). The landing assistance system (100) provides the airborne vehicle (1) with light signals. The landing assistance system comprises at least one geographically positioned light emitter (4, 6, 8) arranged at near ground level on the landing area (2). At least one first light emitter (6) of the at least one geographically positioned light emitter (4, 6, 8) is arranged to emit light to a designated position in space. The light comprises at least three light beams (B1-B3), wherein a first beam (B1) being a central beam, which indicates a designated glideslope, and at least a second beam (B2) and third beam (B3) indicating that said airborne vehicle (1) is positioned under or above the designated glideslope, respectively.

31 Claims, 4 Drawing Sheets

(58) Field of Classification Search
CPC ........ G01S 17/933; G01S 5/16; G01S 1/7034; G01S 2201/08; G01S 1/7038; G01S 17/89; G01S 17/931; H01L 31/09; G08G 5/0021; G08G 5/025; G08G 5/0026; G05D 1/0684
See application file for complete search history.

(56) References Cited

U.S. PATENT DOCUMENTS

| | | | |
|---|---|---|---|
| 3,999,007 | A | 12/1976 | Crane |
| 4,259,658 | A | 3/1981 | Basov et al. |
| 4,707,696 | A | 11/1987 | Task et al. |
| 5,136,288 | A | 8/1992 | Briatte |
| 5,287,104 | A * | 2/1994 | Shemwell ............... G08G 5/025 340/555 |
| 2010/0110198 | A1 * | 5/2010 | Larson .................... B64F 1/20 42/114 |
| 2012/0076397 | A1 | 3/2012 | Moresve |
| 2015/0081143 | A1 | 3/2015 | Snow et al. |
| 2018/0105288 | A1 * | 4/2018 | Atkinson ................. B64F 1/20 |

FOREIGN PATENT DOCUMENTS

| | | |
|---|---|---|
| EP | 2919219 A1 | 9/2015 |
| GB | 2504712 A | 2/2014 |

OTHER PUBLICATIONS

Swedish Patent and Registration Office, Office Action, including Search Report, received for Application No. 1950744-1, dated Dec. 19, 2019, 11 pages, Sweden.

Swedish Patent and Registration Office, Decision by the Board received for International Application No. PCT/SE2020/050632, dated Sep. 2, 2020, 5 pages, Sweden.

European Patent Office, Extended European Search Report received for Application No. 20825479.7, dated Nov. 22, 2022, 8 pages, Germany.

* cited by examiner

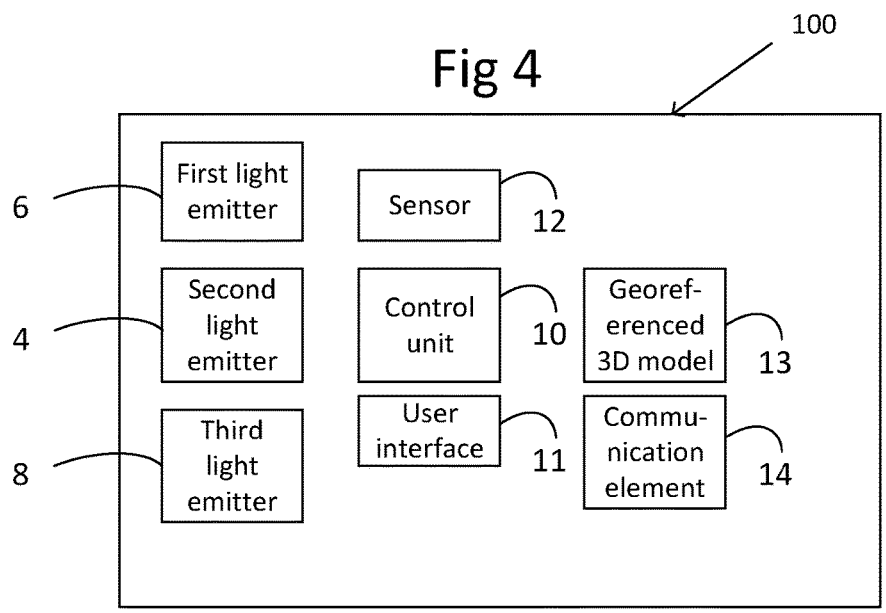
Fig 4
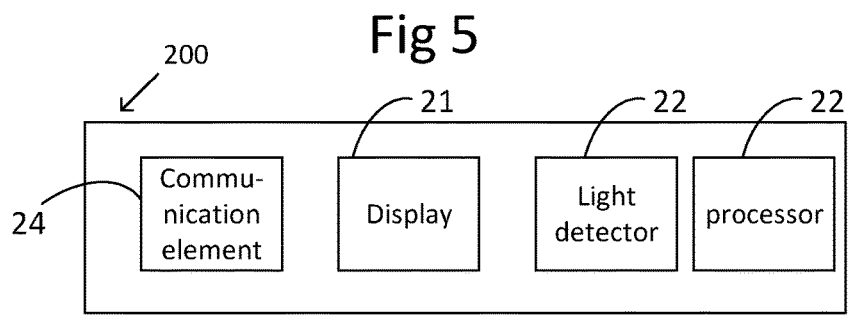
Fig 5
Fig 7
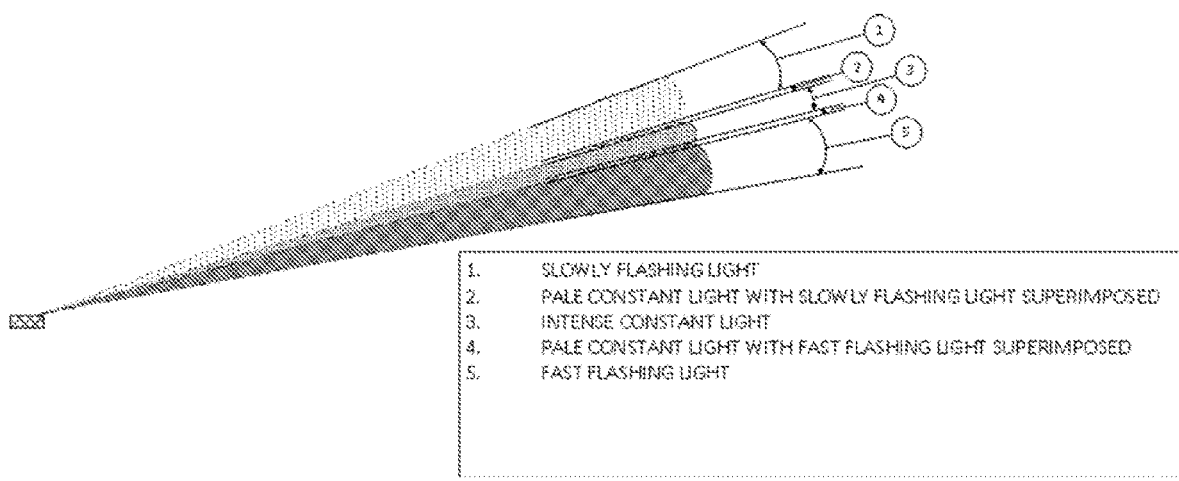

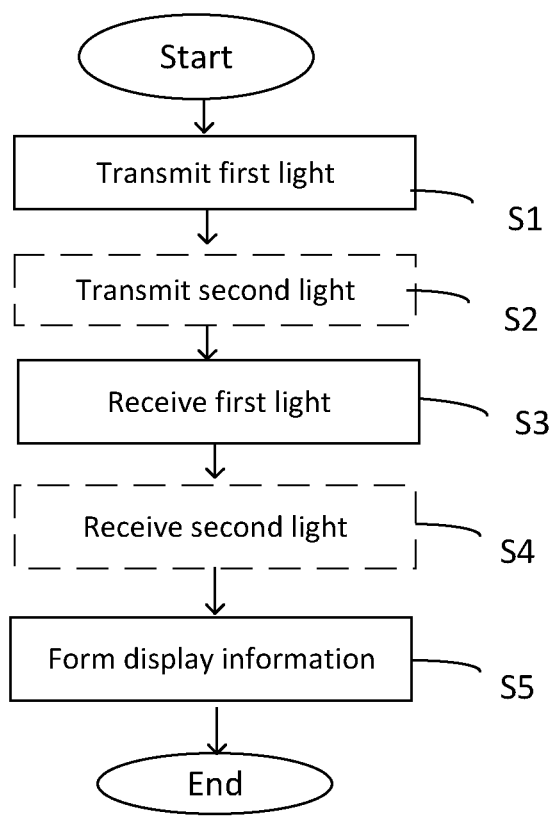

AIRBORNE VEHICLE ASSISTED LANDING SYSTEM AND METHOD THEREOF

CROSS REFERENCE TO RELATED APPLICATIONS

This application is a National Stage Application, filed under 35 U.S.C. § 371, of International Application No. PCT/SE2020/050632, filed Jun. 17, 2020, which international application claims priority to and the benefit of Swedish Application No. 1950744-1, filed Jun. 18, 2019; the contents of both of which as are hereby incorporated by reference in their entireties.

BACKGROUND

Related Field

The present disclosure relates to an assisting airborne vehicle landing system and method for the same.

The present disclosure further relates to a computer program and a computer program product.

Description of Related Art

Assisting airborne vehicles during landing on a runway, helipad or temporary landing zone is a crucial part of making the landing safe. In order to assist the airborne vehicle, navigating indicators, such as light, is used.

Two of the most common landing assisting systems are Instrument Landing Systems, ILS, and Precision Approach Path Indicators, PAPI.

The ILS system provides horizontal and vertical precision guidance to airborne vehicles during landing on a runway, by transmitting radio signal from emitters on the runway to the cockpit of the airborne vehicle. The ILS system enables pilots to obtain a digitalized visual aid, displaying the position of said airborne vehicle in relation to the runway.

The ILS system comprises a plurality of components, both on ground level and arranged on said airborne vehicles. This makes the ILS system costly and cumbersome to implement for instance at smaller airports and temporary airports.

The PAPI system is a visual aid that provides guidance information to help acquire and maintain the correct glideslope during landing on a runway for an airborne vehicle, such as an aircraft, drone or helicopter. The PAPI system displays a combination of red and/or white light visible by the pilot of said airborne vehicle. The different combinations of said visible light indicates the current glideslope, i.e. too high, too low, or on correct glideslope path.

However, the emitted light signals will not have the ability to propagate well in certain weather conditions, hence there is a risk that the pilot will not be able to see the light and therefore can not be assisted during the landing procedure.

US20100110198A1 discloses an optical illuminator assembly, OIA, positioned adjacent a runaway on both sides of the runway, and at the beginning of said runway. The OIA emits light within the wavelength region of 8-12 µm. The OIA may include one or more MIR (mid infrared) laser sources, which generates an output beam captured by a MIR imager arranged on the vehicle.

U.S. Pat. No. 4,259,658 discloses two light sources positioned on either side of a center line of a runway. The light beams of the light sources are orientated in a glideslope plane. A third light source is positioned on the center line.

BRIEF SUMMARY

It is an objective of the present disclose to present a system, which improves assistance in landing an airborne vehicle. The system configuration makes it easy to quickly set up a temporary landing area such as a runway. The system will guide the airborne vehicle down from a given position (coordinate) along a correct path for safe landing on the runway or landing area.

This objective has in accordance with different embodiments of the present invention been achieved by means of an airborne vehicle landing assisting system for assisting an airborne vehicle during landing on a landing area, which system provides the airborne vehicle with light signals. The landing assistance system comprises at least one geographically positioned light emitter arranged at near ground level on the landing area. At least one first light emitter of the plurality of geographically positioned light is arranged to emit light to a designated position in space, said light comprising at least three light beams. A first beam is a central beam, which indicates a designated glideslope, and at least two beams, a second beam and third beam, indicate that said airborne vehicle is positioned under or above the designated glideslope, respectively.

Thus, the airborne vehicle landing assisting system assists airborne vehicles during landing by indicating the desired glideslope, visible by light sensor means onboard the airborne vehicle during inclement weather conditions, e.g. fog. An indication is provided whether the airborne vehicle is positioned at, over or under a desired glideslope, i.e. the airborne vehicle is guided to the designated glideslope.

Further, this orientation information is obtained by use of already existing and non-complex sensor components of the airborne vehicle.

The solution as presented herein requires a non-expensive system for assisting the airborne vehicle. For example, the ILS is not accurate enough for continued approach at altitudes lower than 200 ft. Therefore, the system presented in the present disclose can replace as well as complement an ILS.

Further, the solution as presented herein is scalable.

Further, the solution as defined herein may be implemented as a mobile system. It can then be used for setting up landing areas at any suitable location. The solution as defined herein may also be implemented at permanent landing areas.

Thus, no extra equipment at the airport nor extra equipment on the airborne vehicle is required. As a consequence, complexity and costs can be reduced.

In different embodiments, the at least one first light emitter comprises at least two light emitters placed on opposite sides of said landing area. The spatial relation between said first light emitters indicates the width of said landing area.

A second emitter is placed at the landing area border, i.e. the beginning of the landing area.

A third emitter is place at the end of the landing area.

In different embodiments, the second emitter is arranged to emit modulated light for communication to the aircraft.

In different embodiments, the second and third emitters are aligned to also indicate a synthetic landing area centreline.

In different embodiments, the first emitter/s is/are arranged so that the three beams have different modulation for easy differentiation between the beams, allowing for a simple detector of the beams. For example, the center beam can be unmodulated and the upper and lower beams modulated with different frequency.

In different embodiments, the geographically positioned light emitters are arranged to emit light at at least one wavelength within at least one of the ranges from 1 to 3 µm, 3 to 5 µm, 8 to 14 µm and/or the mmW. These wavelengths also correspond to the sensor wavelength available on airborne platforms today, and in the near future.

The term light emitter is herein intended to be interpreted broadly and include both light within the visual field and light outside the visual field. In particular, the term light is intended to include the ranges as given above.

Within this range of wavelengths, the radiation propagates well in inclement weather conditions. This is since the composition of our atmosphere is such that only light in certain wavelength ranges can penetrate the atmosphere well. These wavelength ranges are called atmospheric windows.

In different embodiments, the first beam is arranged to extend at approximate 3° in relation to the landing area.

The emission of light at approximate 3° in relation to the landing area gives a smooth and comfortable landing approach for an airplane. However, different types of airborne vehicles may have different appropriate angels, for instance, a helicopter may have a glideslope at 5°-15°, and a normal approach is 10°.

In different embodiments, the at least one geographically positioned light emitter comprises a laser emitter. Thus, the geographically positioned light emitter may be arranged to emit laser light.

In different embodiments, in the at least one first emitter, at least the first (central) light beam is of different modulation frequency than the second (upper) and third (lower) light beam, so as to make the light beams distinguishable from each other by light sensor means arranged on the airborne vehicle.

In different embodiments, the respective centrally distributed first beam is unmodulated, continuous and possibly having a maximum intensity.

By constantly enlightening a path from the landing area towards a given and communicated space coordinate and possibly also a given bearing or orientation, said airborne vehicle if positioned at the given space coordinate or all the way along the correct path, will have a detectable guiding path which the airborne vehicle can follow.

In different embodiments, in the at least one first emitter, the respective second (upper) beam and the respective third (lower) beam are modulated and configured to emit a flashing light at different timings.

Thereby the first, second and the third beams are distinguishable from each other, due to the different modulation frequencies.

In different embodiments, at least one emitter, preferably the second light emitter is arranged to emit/transmit information regarding the identity of the landing area. This could be done by modulation of the emitted light. The second emitter may be placed at the landing area border, i.e. the beginning of the landing area. Thereby, the threshold of the landing area is indicated.

In different embodiments, the at least one geographically positioned light emitter system further comprises at least one third emitter positioned at the end of the landing area and being arranged to indicate at least the end of said landing area.

The at least one geographically positioned light emitter may be mobile/portable.

In different embodiments, the landing assistance system further comprises at least one control unit.

The control unit may be configured to determine a geographical coordinate and possible orientation relating to the designated position in space in relation to the landing area. Thus, the geographical coordinate and possible orientation may be determined based on a geographical position of the landing area. The geographical position of the landing area and possible its orientation in the terrain may be formed based on the position(s) of the at least one first emitter and/or second emitter and/or third emitter.

For example, the at least one movable emitter can be used to determine the properties of a potential landing area, by the use of light emitting measurement means. Also, the distance to the approaching aircraft could be detected, e.g. by reflections of the beam from the second emitter to an appropriate sensor, and communicated to the aircraft.

In different embodiments, the control unit is arranged to determine the geographical position and/or orientation of the at least one geographically positioned light emitter to obtain a desired designated glideslope, geographical coordinate and possible orientation relating to the designated position in space.

The control unit may further be arranged to determine the geographical coordinate and possible orientation related to the designated position in space based on a georeferenced three-dimensional model of the environment. In accordance with this example, the control unit may be arranged to determine suitable positions of at least some of the emitters and a suitable geographical coordinate and possible orientation relating to the designated position in space, based on the georeferenced model of the environment. Thus, information from the geo-referenced tree-dimensional model of the environment may be used for finding suitable landing areas in the terrain. Further, the position(s) and possible bearing of the first and/or second and/or third emitter may be determined based on the georeferenced three-dimensional model. Further, the information from the geo-referenced tree-dimensional model of the environment may further be used for finding suitable designated positions and possible orientation in space, based on the information in the geo-referenced model of the environment. Thus, the designated position and possible orientation may be determined based on for example mountains, hills etc. in the vicinity of the landing area.

In different embodiments, the landing assistance system further comprises at least one sensor. The sensor can be used to measure or gather data relevant for landing. The data relevant for landing may include weather conditions such as wind condition, temperature and visual range close to ground. The sensors are characteristically placed on the ground and transmitted to the airborne vehicle and/or a system for control of the airborne vehicle.

The control unit is then arranged to receive the sensed quantity(ies) and communicate the information to the airborne vehicle and/or to a system for control of the airborne vehicle. One way to communicate the information could be to modulate at least the second emitter (situated at the border of the landing area) thus using the emitted beam to transmit information from the control unit to the vehicle. Another such information that could be transmitted to the vehicle is the airport identity information.

In different embodiments, the at least one first emitter and/or the second emitter and/or the third emitter has a means to determine its orientation. The means for determining the orientation of the emitter may include for example a gyroscope, accelerometer, inertial navigation system and/or pendulum. In different embodiments, at least one of the emitters comprises a location determining element, such as a GPS receiver, for obtaining the georeferenced position of the emitter. At least one of the emitters may comprise a communication element for communication with the control unit.

The rotational direction of the emitted beams can be set manually or automated by signals from the control unit, to the desired rotational direction. Accordingly, the designated glideslope and the geographical coordinate and possible orientation relating to the designated position in space may be changed whenever appropriate. A new rotational direction of the respective emitter may be determined automatically based on sensor input for example relating to weather conditions (e.g. wind direction) and/or based on user input relating to a desired orientation of the designated glideslope and/or the geographical coordinate and possible orientation relating to the designated position in space. The control unit may then be arranged to control the rotational direction of the emitters based in said sensor and/or user input.

The control unit may be arranged to determine a power for said at least one geographically positioned light emitter and to control the at least one geographically positioned light emitter to adapt the output power based on the determined power.

This allows for improving the penetration ability at an inclement weather condition, while the power can be reduced when conditions so allow. As a consequence, a reduction of transmission power, equipment, and/or costs can be obtained.

In different embodiments, at least a part of the control unit is arranged at or integrated with one of the at least one geographically positioned light emitter.

The landing assistance system comprises in different embodiments further a communication element arranged to communicate the determined coordinate and possible orientation relating to the designated position in space directly or indirectly to the airborne vehicle.

In different embodiments, the control unit is arranged to receive an activation signal and to activate the at least one geographically positioned light emitter in response to reception of the activation signal.

In different embodiments, the control unit is arranged to receive a deactivation signal and to deactivate the at least one geographically positioned light emitter in response to reception of the deactivation signal.

The present disclosure further relates to a computer program for assisting an airborne vehicle during landing on a landing area, comprising instructions which, when executed by a computer, cause the computer to perform the functions of the control unit as defined above.

The present disclosure further relates to a computer program product for assisting an airborne vehicle during landing on a landing area, comprising a computer-readable medium comprising instructions which, when executed by a computer, cause the computer to perform the functions of the control unit as defined above.

In relation to this disclosure the term computer can relate to what is commonly referred to as a computer and/or to an electronic control unit.

The system, method, computer program and computer program product have corresponding advantages as have been described in connection with the corresponding examples of the system according to this disclosure.

The present disclosure further relates to a method for airborne vehicle landing assistance. The method comprises: transmitting from at least one first emitter first light to a designated position in space, said transmitted first light comprising at least three light beams, wherein a first light beam being a central beam indicating a designated glideslope, a second light beam emitting light indicating that said airborne vehicle is positioned under the designated glideslope and a third beam emitting light indicating that said airborne vehicle is positioned above the designated glideslope; obtaining at the airborne vehicle information relating to said designated position in space; receiving at the airborne vehicle first light; and forming display information data for landing assistance, based on the received first light. The display information indicates the vertical orientation of the airborne vehicle in relation to the glideslope.

The method may further comprise transmitting second light from a second light emitter, to said designated position in space, wherein said second light indicating the beginning of said landing area and a distance from the beginning of the runaway to the airborne vehicle; and receiving the airborne vehicle second light, wherein the display information data for landing assistance is formed also based on the received second light.

The method may also comprise transmitting third light from a third light emitter positioned at the end of the landing area, to indicate at least the end of said landing area.

Further advantages of the present invention are described in the following detailed description and/or will arise to a person skilled in the art when performing the invention.

BRIEF DESCRIPTION OF THE FIGURES

For a more detailed understanding of the present invention and its objects and advantages, reference is made to the following detailed description which should be read together with the accompanying drawings. Same reference numbers refer to same components in the different figures. In the following.

FIG. 4 is a block scheme schematically showing an example of a landing assistance system.

FIG. 5 is a block scheme schematically illustrating an example of a system onboard an airborne vehicle.

FIG. 6 is a flow chart schematically illustrating an example of a method for airborne vehicle landing assistance.

FIG. 7 shows, in a schematic way, an example of use of a landing assistance system as disclosed herein.

DETAILED DESCRIPTION OF VARIOUS EMBODIMENTS

Figure 1:
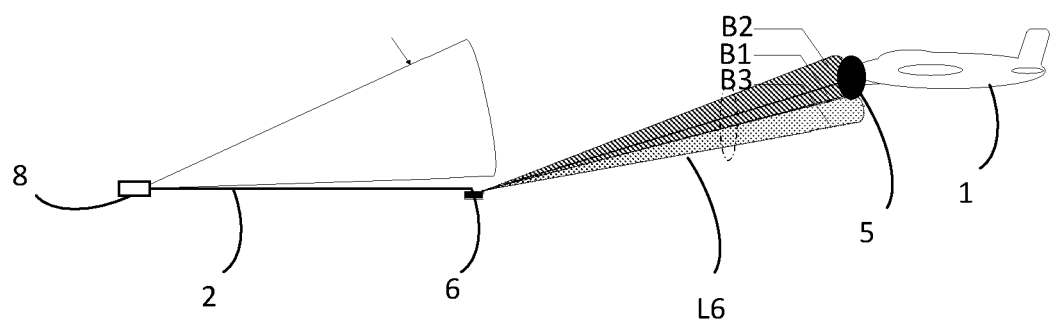
FIG. 1-3 shows, in a schematic way, a set up for airborne vehicle landing assistance according to different embodiments of the present disclosure.
Figure 2:
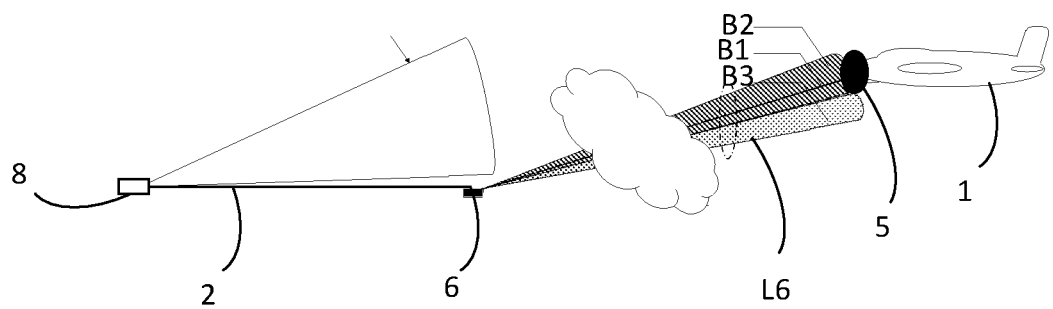
Figure 3:
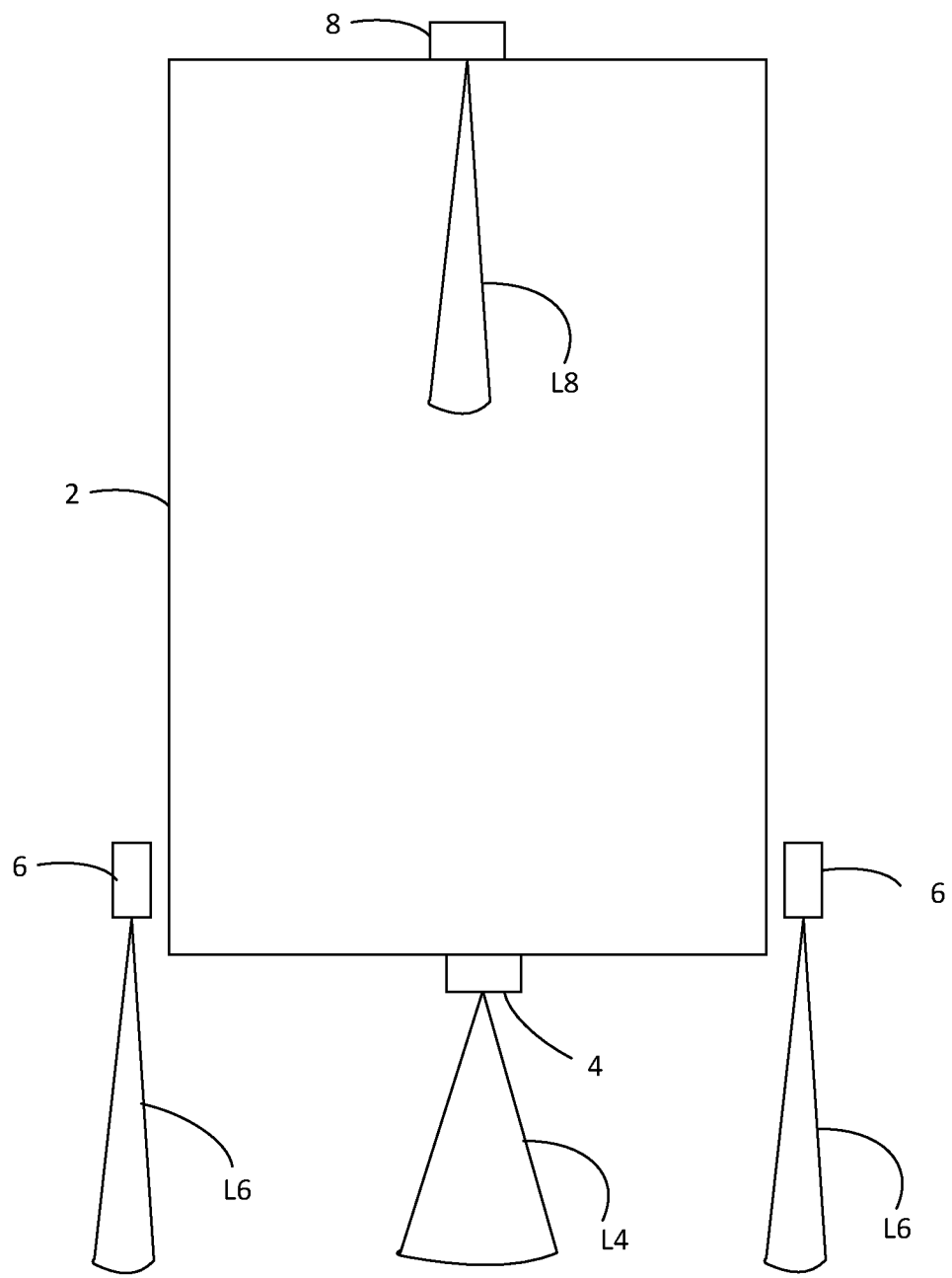

FIGS. 1-3 show, in a schematic way, an airborne vehicle 1 approaching a landing area 2 in order to land on said landing area 2. The airborne vehicle 1 can be any type of aircraft, such as an airplane, a helicopter, an airship or the like. The airborne vehicle 1 can be manned or unmanned. The landing area can be a runway, helicopter platform or any other type of landing area. E.g. for a drone it may be quite small.

FIGS. 1-3 shows, in a schematic way, the airborne vehicle 1 approaching the runway 2 in order to land on said runway 2. The difference between FIG. 1 and FIG. 2, is that in the latter, an atmospheric condition prevails e.g. weather condition (illustrated as a cloud in FIG. 2).

At least one geographically positioned light emitter 4, 6 8 is arranged at ground level or near ground level on the runway 2. The at least one geographically positioned light emitter 4,6,8 is preferably positioned at a border of the runway or landing area/platform.

The at least one geo-positioned light emitter 4, 6, 8 is configured to emit light at a wavelength which can penetrate said atmospheric condition to a level detectable by the/a corresponding sensor on the airborne vehicle and at a level sufficiently above the noise level of the sensor or the background. The wavelengths which can penetrate the atmospheric condition are characteristically referred to as an atmospheric window. The light is emitted at a wavelength for example in the range 8-14 µm.

A first light emitter 6 of the at least one geographically positioned light emitter 4,6,8 is arranged to emit light to a designated position in space 5. The designated position in space 5 is for example associated to a geographical coordinate determined based on the geographical coordinate of the first light emitter 6. The airborne vehicle 1 may have information relating to the geographical coordinate associated to the designated position in space 5.

FIGS. 1 and 2 illustrate that an airborne vehicle 1 has navigated to a runway 2, using the information relating to a designated position in space 5.

The first light emitter 6 emits first light L6 corresponding to a guiding path, glideslope, for the airborne vehicle 1 to follow in order to have a safe approach to the runway 2. When said airborne vehicle 1 is at or nearby the designated position in space it can detect the first light L6 emitted from the first emitter 6. The airborne vehicle 1 is characteristically arranged with a light detection sensor capable of capturing light having a wavelength within the atmospheric window, i.e. which can penetrate the atmosphere. The light detection sensor may be a camera such as EFVS, Enhanced Flight Vision System. The signal detected by the light detection sensor is used for assisting landing.

The light L6 emitted from the first light emitter 6 comprises at least three light beams B1-B3. A first beam B1 is a central beam, which indicates the designated glideslope. At least two beams, a second beam B2 and third beam B3, indicate that said airborne vehicle 1 is positioned above or below the designated glideslope.

Thus, said light L6 corresponds to the vertical orientation in relation to designated glideslope. The light detection sensor may be configured to provide display information data for a display such as a HUD based on received light L6 emitted from the first light emitter 6, so as to assist landing. Alternatively, or as a complement, the signal provided by the light detection sensor is used as an input signal to a landing control system. This alternative is for example suitable for an airborne vehicle such as a drone or unmanned vehicle.

Thus, display information data for the display such as a HUD and/or the input signal to a landing control system is formed based on received light L6 emitted from the first light emitter 6 to indicate the vertical orientation of the airborne vehicle in relation to the designated glideslope The first centre beam B1 may be arranged to emit light in direction of the designated glide slope in relation to the runway 2. Typically, approximately 3° is a well-established designated path slope for an airborne vehicle 1 during landing/approaching procedure in order to obtain a safe landing. The glideslope can be described as a path projected by said first light emitter 6.

The airborne vehicle 1 light detection camera arrangement or other sensor, can see or detect the emitted light, even in inclement weather conditions, and based on the detected beam change its vertical position accordingly. This is similar to the PAPI-system with the exception that in accordance with the wavelength range as disclosed herein, the light can be detected even in inclement weather conditions.

In the illustrated example, as seen in FIG. 3, two first light emitters 6, are placed on opposite sides of said runway 2. The spatial relation between said first light emitters 6 indicate the width of said runway 2. The first emitters are characteristically both arranged to emit light to the designated position in space 5.

The plurality of movable geographically positioned light emitters 4, 6, 8 may comprise a second light emitter 4. In the illustrated example, the second light emitter 4 is centrally positioned in the beginning of said runway 2. The second light emitter 4 is arrange to emit second light L4 for use to indicate the runway threshold. This emitter can be combined with a sensor to also measure and calculate at least the distance between the airborne vehicle 1 and said light second emitter 4. The calculated distance may be communicated to the airborne vehicle. The calculated distance may be communicated by encoding the distance information in the light beams of any of the light emitters or using other communication means.

By aligning the at least one second light emitter 4 and a third light emitter 8 not only the vertical orientation of an airborne vehicle 1 is obtained, but also an indication of a desired horizontal orientation.

The light L4 emitted from the second light emitter 4 and the light L6 emitted from the first light emitter 6 can be differently modulated. For example, the second emitter 4 may be arranged to emit modulated light. The at least one first light emitter 6 is arranged to form the first light beam B1 by unmodulated light and/or to form the second and third beams B2, B3 by modulated light.

In one example, the plurality of beams comprise light at a different frequencies, which makes the beams distinguishable from each other by the light sensor means arranged on the airborne vehicle 1. For example, at least the first light beam (B1) is of different frequency than the second (B2) and third (B3) light beams, so as to make the light beams distinguishable from each other by light sensor means 3 arranged on the airborne vehicle 1.

Another example of beam configuration can be that the central first beam B1 comprises unmodulated light. The unmodulated light of the first beam may be continuous and possibly having a maximum intensity.

The second and third beams B2, B3 may comprise modulated light. For example, the first emitter(s) 6 may be arranged to emit flashing, modulated light at different timings to form the second and third beams B2, B3. This makes the beams distinguishable from each other and a system onboard said airborne vehicle 1 can determine if the airborne vehicle 1 is above or below designated glideslope.

One example of light configuration can be to configure the second light emitter 4 to emit modulated light. Thereby, the second light emitter is able to send information to the airborne vehicle 1. The second light emitter 4 may then be arranged to emit/transmit information to the airborne vehicle 1 for instance regarding the identity of the runway 2.

In the illustrated example, a third light emitter 8 is positioned in the end of the runway 2 indicating at least the end of said runway 2. Thus, the third light emitter may mainly be used after the airborne vehicle has hit the ground and the first and second light emitters may not be visible in the airborne vehicle any more. From a distance, light emitters 4 and 8 can form a synthetic runway centerline.

The at least one geographically positioned light emitter 4, 6, 8 is characteristically movable or portable.

Thereby, a temporary runway can be set up at any time. The light emitters 4,6,8 may be placed at a location which will form the runway. The designated position in space 5 is determined based on the geographical positions of the first light emitters 6 and based on the desired glideslope. Thus, both a desired angle of the glideslope and desired length of the glideslope may be used to determine the designated position in space 5. The coordinate of the designated position in space and preferably an orientation associated thereto is communicated to the airborne vehicle. The airborne vehicle can then navigate to the designated position in space so that the airborne vehicle has the indicated orientation when arriving at the designated position in space 5.

In the illustrated example, two first light emitters 6 arranged to emit light L6 indicating the vertical orientation of the airborne vehicle in relation to its designated glide slope have been positioned to indicate the side borders of the runway. Further, the second light emitter 4 may be positioned at the start of the runway to indicate the start of the runway. The second light emitter 4 is positioned so as to emit light L4 in a direction towards a designated position in space 5. Finally, the third light emitter 8 may be positioned at the end of the runway to indicate the end of the runway. As the third light emitter may be intended for assistance in navigating mainly after the airborne vehicle has landed, it may be directed in a direction towards the airborne vehicle after having landed in the landing area rather than along the designated glideslope. The light detection sensor of the airborne vehicle may be configured to provide display information data and/or used as an input signal to a landing control system also based on received light emitted from the third light emitter 8, so as to assist landing after hitting the ground.

In FIG. 4, a landing assistance system 100 for assisting an airborne vehicle during landing on a runway is schematically illustrated. The landing assistance system 100 provides the airborne vehicle 1 with light signals, for use in assisting landing of the airborne vehicle. The landing assistance system 100 comprises at least one geographically positioned light emitter 4, 6, 8 arranged at near ground level on the runway. At least one first light emitter 6 of the at least one geographically positioned light emitter 4, 6, 8 is arranged to emit light to a designated position in space, said light comprising at least three light beams.

The light beams comprises a first beam, said first beam being a central beam, which indicates a designated glideslope, and at least a second beam and third beam indicating that said airborne vehicle is positioned under or above the designated glideslope, respectively.

The system may further comprise a second light emitter 4 and/or a third light emitter 8. The designs of the first, second and third light emitters are exemplified in FIGS. 1-3.

The landing assistance system 100 may further comprise at least one control unit 10 for calibration of the landing assistance system to the specific runaway. For example, the control unit 10 may be configured to determine a geographical coordinate and possible orientation relating to the designated position in space based on the geographical position(s) of the at least one geographically positioned light emitter 4, 6, 8.

Further, the control unit 10 may be arranged to determine automatically or assist manual determination of the location of the runway based on a georeferenced three-dimensional textured model 13 of the environment. This may involve that the control unit 10 determines the coordinate and orientation of the respective light emitter. A user interface 11 may be connected to the control unit 10. The user interface 11 may be arranged to present a desired part of the georeferenced textured three-dimensional model 13 of the environment. The presented part may be based on the present position and possible orientation of a user setting up the landing assistance system 100. The user may then mark the positions of the intended positions of the respective light emitter. The control unit 10 may then based thereon determine the designated glideslope, geographical coordinate and possible orientation relating to the designated position in space. The control unit 10 may also be arranged to evaluate the intended positions of the respective light emitter based on the determined designated glideslope, geographical coordinate and possible orientation relating to the designated position in space and based on the georeferenced textured three-dimensional model 13 of the environment. Based on this evaluation, the control element may be arranged to obtain a suggested relocation of the light emitters. The suggested relocation coordinates may be presented by means of the user interface 11. In an alternative solution, the control unit 10 is arranged to determine locations and orientations of the light emitters without any user input via the georeferenced three-dimensional textured model 13 or otherwise.

The control unit 10 may be arranged to determine the designated glideslope and the geographical coordinate relating to the designated position in space based on information affecting landing. The information affecting landing may relate to weather conditions such as wind direction and wind speed. Accordingly, the locations/orientations of the light emitters may also be determined based on the information affecting landing. Thus, the location/orientation of the runway and/or the geographical coordinate relating to the designated position in space may be re-calculated based on the information affecting landing and the positions/orientations of the light emitters may amended accordingly.

As is clear from the above, the control unit 10 may be arranged to first determine or otherwise obtain the geographical position and/or orientation of the at least one geographically positioned light emitter and then determine the designated glideslope, geographical coordinate and possible orientation relating to the designated position in space. Alternatively, the control unit may be arranged to determine the designated glideslope, geographical coordinate and possible orientation relating to the designated position in space for example based on the georeferenced textured three-dimensional model 13 of the environment and based thereon determine the geographical position and/or orientation of the geographically positioned light emitter(s).

The landing assistance system 100 may comprise at least one sensor 12 arranged to sense a quantity affecting landing. The control unit 10 may then be arranged to receive the sensed quantity and to update the geographical position and possible orientation relating to the designated position in space and/or the position(s)/orientation(s) of the light emitter(s) based on the detected quantity. The at least one sensor 12 may comprise a thermal sensor and/or a camera arranged to capture images within the visual field and/or a wind meter and/or a thermometer.

The control unit 10 may be arranged to determine a power for said at least one light emitter 4, 6, 8 based on the condition of the environment and to control the at least one geographically positioned light emitter to adapt the output power based on the determined power. Thus, the at least one light emitter 4, 6, 8 may have an adaptable output power controllable by the control unit 10.

The control unit 10 may be arranged to determine a setting relating to an orientation or direction for said at least one geographically positioned light emitter 4, 6, 8 to point at the geographical coordinate relating to the designated position in space. The determined setting may be transmitted to the respective at least one light emitter positioned at this intended geographical location. The at least one light emitter 4, 6, 8 may have controllable mechanical and/or optical element(s) for controlling the direction of light L4, L6, L8 emitted from the respective emitter. The control unit may then transmit the determined setting to the controllable mechanical and/or optical element(s) for control in accordance therewith. The determined setting may new positions for at least one of the light emitters.

In different embodiments, the at least one first emitter and/or the second emitter and/or the third emitter has a means to determine its orientation. The means for determining the orientation of the emitter may include for example a gyroscope, accelerometer, inertial navigation system and/or pendulum. In different embodiments, at least one of the emitters comprises a location determining element, such as a GPS receiver, for obtaining the georeferenced position of the emitter. At least one of the emitters may comprise a communication element for communication with the control unit.

A rotational direction of the emitted beams can be set manually or automated by signals from the control unit, to the desired rotational direction. Accordingly, the designated glideslope and the geographical coordinate and possible orientation relating to the designated position in space may be changed whenever appropriate. A new rotational direction of the respective emitter may be determined automatically based on sensor input for example relating to weather conditions (e.g. wind direction) and/or based on user input relating to a desired orientation of the designated glideslope and/or the geographical coordinate and possible orientation relating to the designated position in space. The control unit may then be arranged to control the rotational direction of the emitters based in said sensor and/or user input. Thus, the emitters may be rotated to indicate a new designated glideslope at any time. The respective emitter may be rotated in elevation and/or azimuth. For example, the respective emitter may be arranged to operate to switch between two different designated positions in space. For example, the landing may be performed from for example two different directions dependent on different conditions, such as weather conditions, and the emitters may be arranged to automatically switch based on prevailing conditions. Thus, in accordance with this example, there are a plurality of geographical coordinates, and associated possible orientations, and associated designated positions in space, and the emitters may switch there between. However, in some situations, the respective emitter may also need to be relocated to obtain the re-calculated designated glideslope and the geographical coordinate and possible orientation relating to the designated position in space.

At least a part of the control unit 10 may be arranged at or integrated with one of the light emitters (4, 6, 8).

The landing assistance system 100 may further comprise a communication element 14. The communication element may be a radio communication element or any other type of communication element for use at least when communication by encoding information in the beams of the light emitters is not suitable. The communication element may be arranged to communicate the determined coordinate and possible orientation relating to the designated position in space directly or indirectly to the airborne vehicle. Indirect communication may include communication with a landing control system for remote landing control or assistance of the airborne vehicle.

The communication element may be arranged to communicate the distance between the airborne vehicle 1 and said light second emitter 4. The calculated distance may be communicated to the airborne vehicle or to the remote landing control/assistance system.

The control unit 10 may be arranged to receive an activation signal and to activate the at least one geographically positioned light emitter in response to reception of the activation signal. The activation signal may be received via the communication element 14. The activation signal may for example be transmitted from an airborne vehicle approaching the runway. Alternatively, the activation signal is obtained via the user interface 11.

The control unit 10 may further be arranged to receive a deactivation signal and to deactivate the at least one geographically positioned light emitter in response to reception of the deactivation signal. The deactivation signal may be received via the communication element 14. The deactivation signal may for example be transmitted from an airborne vehicle approaching the runway. Alternatively, the deactivation signal is obtained via the user interface 11.

Further, the communication element 14 may be arranged to communicate the coordinate and possible orientation relating to the designated position in space, as determined by the control unit 10 directly or indirectly to the airborne vehicle.

The control unit 10 comprises characteristically a computer program, comprising instructions which, when executed by a computer, cause the computer to perform the functions of the control unit as defined herein.

The control unit 10 comprises a computer program product comprising a computer-readable medium comprising instructions which, when executed by a computer, cause the computer to perform the functions of the control unit as defined herein.

In FIG. 5, an airborne vehicle system 200 is illustrated. When the airborne vehicle 1 arrive at said designated position in space, a light detector 22 arranged on the airborne vehicle 1 can detect emitted light from at least one movable emitter geographical positioned near ground level. In the next step the airborne vehicle 1 position in relation to the glideslope may be determined based on the detected light. This determined vehicle position is comprised in display information transmitted to a display 21 such as a HUD head-up display arranged at said airborne vehicle 1. A processor 22 may be arranged to determine the vehicle position. Thus, the formed information is displayed on the display 21 assists the vehicle during the approach to said runway 2. The airborne vehicle information may further comprise a communication element 24 for communication with the landing assistance system 100. The processor 22 may be arranged to process information received via the communication element 24. The display may be arranged to display information received via the communication element.

FIG. 6 shows, in a schematic way, an example of a situation in which the present disclosure can be used. The flowchart illustrates the method steps which an airborne vehicle 1 go through during the assisted landing operation provided by the system 100.

In FIG. 6, a method for airborne vehicle landing assistance comprising: transmitting S1 from at least one first emitter 6 first light L6 to a designated position in space, said transmitted first light L6 comprising at least three light beams B1-B3, wherein a first light beam B1 being a central beam indicating a designated glideslope, a second light beam B2 emitting light indicating that said airborne vehicle 1 is positioned under the designated glideslope and a third beam B3 emitting light indicating that said airborne vehicle 1 is positioned above the designated glideslope.

The method may further comprise transmitting S2 second light L4 from a second light emitter 4, to said designated position in space, wherein said second light L4 indicating the beginning of said runway 2 and measuring and communicating the distance from the beginning of the runaway to the airborne vehicle 1.

The method comprises further a step of obtaining at the airborne vehicle 2 information relating to said designated position in space. This step comprise receiving S3 at the airborne vehicle first light. This step may also comprise receiving S4 at the airborne vehicle second light. This step further comprises forming S5 display information data for landing assistance, based on the received first light a second light, if any. The display information indicates the vertical orientation of the airborne vehicle in relation to the glideslope. The formed display information is characteristically displayed on a display such as a Head up display, HUD.

FIG. 7 shows, in a schematic way, a transmitted beam. Further, it is illustrated a corresponding indication is illustrated. Said indication is dependent on which sector of the beam is detected at the airborne vehicle.

In accordance with the illustrated example, a LOW warning indication is obtained when the third beam B3 indicating that said airborne vehicle (1) is positioned under the designated glideslope is detected at the airborne vehicle. This LOW warning indication may be a fast flashing light. Further, in accordance with the illustrated example, a potential LOW warning indication may be obtained when a first beam B1 being a central beam, which indicates a designated glideslope is detected along with the third beam B3 at the airborne vehicle. The potential LOW warning indication may be a pale constant light with fast flashing light superimposed. Further, in accordance with the illustrated example, an OK indication is obtained when the first beam B1 is detected at the airborne vehicle. The OK indication may be an intense constant light. Further, in accordance with the illustrated example, a potential HIGH warning indication may be obtained when the first beam B1 is detected along with a second beam B2 indicating that said airborne vehicle is positioned above the designated glideslope. The potential HIGH warning indication may be a pale constant light with slowly flashing light superimposed. Further, a HIGH warning indication is obtained when the second beam B2 indicating that said airborne vehicle is positioned above the designated glideslope is detected at the airborne vehicle. This HIGH warning indication may be a slowly flashing light.

The invention claimed is:

1. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), and
at least one control unit (10) for calibration of the landing assistance system to a specific runway, wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
the control unit is configured to: (i) determine a geographical coordinate and possible orientation relating to the designated position in space and (ii) determine the designated glideslope, geographical coordinate and possible orientation based on a geo-referenced model of the environment.

2. The landing assistance system according to claim 1, wherein the at least one geographically positioned light emitter (4, 6, 8) is movable.

3. The landing assistance system according to claim 1, wherein the control unit is further configured to determine the designated glideslope and the geographical coordinate based on information affecting landing, said information affecting information may comprise weather conditions such as wind direction and wind speed.

4. The landing assistance system according to claim 1, further comprising at least one sensor (12) arranged to sense a quantity affecting landing, said control unit being arranged to receive the sensed quantity and to update the designated glideslope and/or the geographical position based on the detected quantity.

5. The landing system according to claim 4, wherein the at least one sensor comprises a thermal sensor and/or a camera capturing images within the visual field and/or a wind meter.

6. The landing assistance system according to claim 1, wherein the control unit is arranged to determine the geographical position and/or orientation of the geographically positioned light emitter to obtain the determined designated glideslope, geographical coordinate and possible orientation relating to the designated position in space.

7. The landing assistance system according to claim 1, wherein the control unit is arranged to determine a power for said at least one geographically positioned light emitter (4, 6, 8) based on the condition of the environment and to control the at least one geographically positioned light emitter to adapt the output power based on the determined power.

8. The landing assistance system according to claim 1, wherein at least a part of the control unit is arranged at or integrated with one of the at least one geographically positioned light emitter (4, 6, 8).

9. The landing assistance system according to claim 1, further comprising a communication element (14) arranged to communicate the determined coordinate and possible orientation relating to the designated position in space directly or indirectly to the airborne vehicle, wherein the communication element may further be arranged to communicate to the airborne vehicle a determined distance to the airborne vehicle.

10. The landing assistance system according to claim 1, wherein the control unit is arranged to receive at least one of:
an activation signal and to activate the at least one geographically positioned light emitter in response to reception of the activation signal, or a deactivation signal and to deactivate the at least one geographically positioned light emitter in response to reception of the deactivation signal.

11. The landing assistance system according to claim 1, wherein the at least one geographically positioned light emitter (4, 6, 8) is arranged to emit light at a wavelength within a range from 1 to 3 µm, 3 to 5 µm, 8 to 12 µm and/or the mmW.

12. The landing assistance system according to claim 1, wherein the at least one first light emitter (6) comprises at least two light emitters (6) placed on opposite sides of said landing area (2), wherein the spatial relation between said first light emitters (6) indicate the width of said landing area (2).

13. The landing assistance system according to claim 1, wherein the at least one geographically positioned light emitter (4, 6, 8) comprises at least one second light emitter (4) centrally positioned in the beginning of said landing area (2), wherein said second light emitter (4) is arranged to emit light (L4) for use to, measure/calculate and communicate to the vehicle or a vehicle control system at least the distance between the airborne vehicle (1) and said second light emitter (4).

14. The landing assistance system according to claim 1, wherein at least one of:
said second emitter (4) is arranged to emit modulated light, or
the at least one first light emitter (6) is arranged to form the first light beam (B1) by unmodulated light and/or to form the second and third beams by modulated light.

15. The landing assistance system according to claim 1, wherein the first beam (B1) is arranged to extend at approximate 3° in relation to the landing area (2).

16. The landing assistance system according to claim 1, wherein the at least one geographically positioned light emitters (4, 6, 8) comprises a laser emitter arranged to emit laser light.

17. The landing assistance system according to claim 1, wherein at least the first light beam (B1) is of different modulation frequency than the second (B2) and third (B3) light beams, so as to make the light beams distinguishable from each other by light sensor means (3) arranged on the airborne vehicle (1).

18. The landing assistance system according to claim 1, wherein the respective centrally distributed first beam (B1) is unmodulated, continuous and possibly having a maximum intensity.

19. The landing assistance system according to claim 1, wherein the respective second beam (B2) and the respective third beam (B3) is modulated and configured to emit a flashing light at different timings.

20. The landing assistance system according to claim 1, wherein the at least one geographically positioned light emitter (4, 6, 8) further comprises at least one third emitter (8) positioned in the end of the landing area (2) and being arranged to indicate at least the end of said landing area (2).

21. A computer program for assisting an airborne vehicle (1) during landing on a landing area (2), comprising instructions which, when executed by a computer, cause the computer to perform the functions of the control unit as defined in claim 1.

22. A computer program product for assisting an airborne vehicle (1) during landing on a landing area (2), comprising a computer-readable medium comprising instructions which, when executed by a computer, cause the computer to perform the functions of the control unit as defined in claim 1.

23. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), and
at least one control unit (10) for calibration of the landing assistance system to a specific runway,
wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
the control unit is configured to: (i) determine a geographical coordinate and possible orientation relating to the designated position in space and (ii) determine the designated glideslope, geographical coordinate and possible orientation relating to the designated position in space based on the geographical position and/or orientation of the geographically positioned light emitter.

24. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2),
at least one control unit (10) for calibration of the landing assistance system to a specific runway, and
a communication element (14) arranged to communicate the determined coordinate and possible orientation relating to the designated position in space directly or indirectly to the airborne vehicle,
wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
the communication element is further arranged to communicate to the airborne vehicle a determined distance to the airborne vehicle.

25. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), and
at least one control unit (10) for calibration of the landing assistance system to a specific runway, wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
the control unit is arranged to receive an activation signal and to activate the at least one geographically positioned light emitter in response to reception of the activation signal.

26. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), and
at least one control unit (10) for calibration of the landing assistance system to a specific runway,
wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
the control unit is arranged to receive a deactivation signal and to deactivate the at least one geographically positioned light emitter in response to reception of the deactivation signal.

27. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively,
the at least one geographically positioned light emitter (4, 6, 8) comprises at least one second light emitter (4) centrally positioned in the beginning of said landing area (2), and
said second light emitter (4) is arranged to emit light (L4) for use to measure/calculate and communicate to the vehicle or a vehicle control system at least the distance between the airborne vehicle (1) and said second light emitter (4).

28. A landing assistance system (100) for assisting an airborne vehicle (1) during landing on a landing area (2), which landing assistance system (100) provides the airborne vehicle (1) with light signals, the landing assistance system comprising:
at least one geographically positioned light emitter (4, 6, 8) arranged at near ground level on the landing area (2), wherein:
at least one first light emitter (6) of the at least one geographically positioned light emitter (4, 6, 8) is arranged to emit light to a designated position in space, said light comprising at least three light beams (B1-B3),
a first beam (B1) being a central beam, which indicates a designated glideslope, and at least a second beam (B2) and third beam (B3) indicating that said airborne vehicle (1) is positioned under or above the designated glideslope, respectively, and
at least one emitter, preferably the second light emitter (4) is arranged to emit/transmit information regarding the identity of the landing area.

29. A method for airborne vehicle landing assistance, the method comprising:
transmitting (S1) from at least one first emitter (6) first light (L6) to a designated position in space, said transmitted first light (L6) comprising at least three light beams (B1-B3), wherein a first light beam (B1) being a central beam indicating a designated glideslope, a second light beam (B2) emitting light indicating that said airborne vehicle (1) is positioned under the designated glideslope and a third beam (B3) emitting light indicating that said airborne vehicle (1) is positioned above the designated glideslope,
calibrating at least one control unit (10) to a specific runway, the control unit being configured to: (i) determine a geographical coordinate and possible orientation relating to the designated position in space and (ii) control unit determine the designated glideslope, geographical coordinate and possible orientation based on a georeferenced model of the environment,
obtaining at the airborne vehicle (2) information relating to said designated position in space,
receiving (S3) at the airborne vehicle first light, and
forming (S5) display information data for landing assistance, based on the received first light said display information, indicating the vertical orientation of the airborne vehicle in relation to the glideslope.

30. The method according to claim 29, wherein the at least one geographically positioned light emitter (4, 6, 8) is movable and wherein the landing assistance system is controlled to be calibrated to the specific runway.

31. The method according to claim 29, further comprising:
transmitting (S2) second light (L4) from a second light emitter (4), to said designated position in space, wherein said second light (L4) indicating the beginning of said landing area (2) and a distance from the beginning of the runway to the airborne vehicle (1), and
receiving (S4) at the airborne vehicle second light,
wherein the display information data for landing assistance is formed (S5) also based on the received second light.

* * * * *